US007092507B2

(12) United States Patent
Schell et al.

(10) Patent No.: US 7,092,507 B2
(45) Date of Patent: Aug. 15, 2006

(54) METHOD, SYSTEM AND STORAGE MEDIUM FOR TRACKING TECHNICIAN CALLS TO A CALL CENTER

(75) Inventors: H. Mike Schell, Brandon, MS (US); Dustin Majure, Philadelphia, MS (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 427 days.

(21) Appl. No.: 10/408,943

(22) Filed: Apr. 8, 2003

(65) Prior Publication Data
US 2004/0202307 A1 Oct. 14, 2004

(51) Int. Cl.
*H04M 3/00* (2006.01)
(52) U.S. Cl. .............................. 379/265.02; 379/265.01
(58) Field of Classification Search ..............................
379/265.01–265.14, 246.01–246.1
See application file for complete search history.

(56) References Cited

U.S. PATENT DOCUMENTS 6,570,980 B1 * 5/2003 Baruch .................. 379/265.12
6,778,638 B1 * 8/2004 Jean et al. ................ 379/9.02
2003/0018714 A1 * 1/2003 Mikhailov et al.
2003/0028676 A1 * 2/2003 Pangrac et al.
2003/0134599 A1 * 7/2003 Pangrac et al.
2003/0220827 A1 * 11/2003 Murphy

OTHER PUBLICATIONS

Telcordia Technologies, Inc., Telcordia Tech Access System, Global Technician Access System, 2000, pp. 1-3.

* cited by examiner

*Primary Examiner*—William J. Deane, Jr.
(74) *Attorney, Agent, or Firm*—Cantor Colburn LLP

(57) ABSTRACT

An embodiment of the invention is a method of tracking calls from technicians equipped with technician assistance devices. The method includes a call center personnel accessing a call center terminal and the call center personnel receiving a call from a technician. The call center personnel enters call data through a user interface including a plurality of fields, one of the fields being a designation of whether the call from the technician was necessary or unnecessary. The call data is stored. Upon receiving a request from a user, a report is generated identifying the call from the technician as necessary or unnecessary. A system and computer program for implementing the method are disclosed.

12 Claims, 4 Drawing Sheets

FIG. 3

| | SMC | Turf | Emp. Code | Tel. No. | Call Reason | Comment | Call Returned | Reason Technet Wasn't Used | Comment | Necessary Call? | TimeStam |
|---|---|---|---|---|---|---|---|---|---|---|---|
| View Edit | 921 | South Mississippi | 164 | 601 797-9249 | Inquiry | None | False | N/A | None | True | 9/10/02 3:13:33 PM |
| View Edit | 921 | South Mississippi | 164 | 797-3516 | Correct will serve | None | False | Other (Requires Comment) | dif tea | False | 9/23/02 3:48:15 PM |
| View Edit | 921 | South Mississippi | 177 | t68ytp52 | Correct will serve | new tea full no avl prs | False | N/A | None | True | 9/14/02 10:32:46 AM |
| View Edit | 921 | South Mississippi | 177 | 545-3293 | Inquiry | None | False | No Technet | None | False | 10/19/02 10:00:20 AM |
| View Edit | 921 | South Mississippi | 177 | n6fbj4g9 | Inquiry | None | False | Other (Requires Comment) | ords that r canc | False | 9/14/02 9:16:17 AM |
| View Edit | 921 | South Mississippi | 179 | 601 250-6282 | Inquiry | None | False | N/A | None | True | 11/2/02 11:36:37 AM |
| View Edit | 921 | South Mississippi | 183 | 425-9554 | Inquiry | None | False | Training | None | False | 11/21/02 1:47:54 PM |
| View Edit | 921 | South Mississippi | 186 | 601 444-9881 | Pair Change | None | False | N/A | None | True | 9/9/02 9:27:18 AM |
| View Edit | 921 | South Mississippi | 187 | 601 731-1769 | Pair Change | None | False | N/A | None | True | 9/4/02 3:33:06 PM |
| View Edit | 921 | South Mississippi | 187 | 601 736-1413 | Inquiry | None | False | N/A | None | True | 9/6/02 3:37:26 PM |

*FIG. 4*

METHOD, SYSTEM AND STORAGE MEDIUM FOR TRACKING TECHNICIAN CALLS TO A CALL CENTER

BACKGROUND OF THE INVENTION

The present invention relates generally to call tracking and in particular to tracking calls placed by technicians to call centers.

Field technicians are employed in a variety of industries to service equipment, customers, etc. For example, providers of telecommunications services employ field technicians for testing, troubleshooting, installing and maintaining telecommunications connections between a source, such as a central office, and a destination, such as a residential home or commercial building. Often, technicians contact a call center to request assistance, such as sending a test signal along a path.

Tools exist for aiding technicians in the field. For example, Telcordia provides a Tech Access System that provides technicians wireline or wireless access to a home base. This provides immediate access to operations systems for network testing, work assignment, maintenance and customer information. Such technician assistance devices should reduce the number of calls made to call centers allowing for call center staffing to be reduced. In practice, however, technicians continue to contact the call center despite having a technician assistance device. Such calls burden the call centers, which may have reduced staffing due to implementation of the technician assistance devices.

SUMMARY OF THE INVENTION

An embodiment of the invention is a method of tracking calls from technicians equipped with technician assistance devices. The method includes a call center personnel accessing a call center terminal and the call center personnel receiving a call from a technician. The call center personnel enters call data through a user interface including a plurality of fields, one of the fields being a designation of whether the call from the technician was necessary or unnecessary. The call data is stored. Upon receiving a request from a user, a report is generated identifying the call from the technician as necessary or unnecessary. A system and computer program for implementing the method are disclosed.

BRIEF DESCRIPTION OF THE DRAWINGS

Referring to the exemplary drawings wherein like elements are numbered alike in the accompanying Figures:

FIG. 3 is an exemplary call center user interface for recording call data;

FIG. 4 is an exemplary report generated based on stored call data.

DETAILED DESCRIPTION OF THE INVENTION

Figure 1:
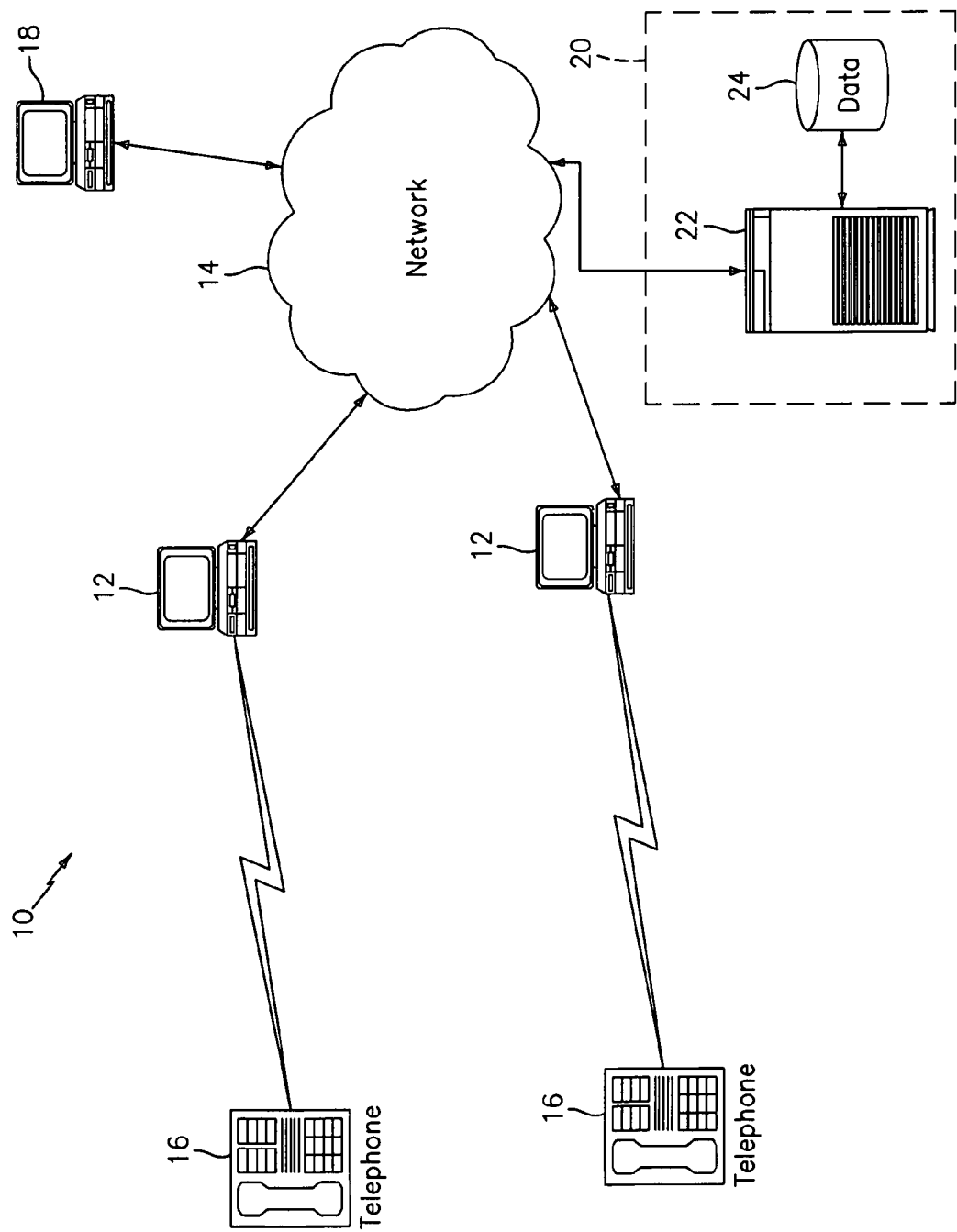
FIG. 1 is a block diagram of an exemplary system for implementing the invention.

FIG. 1 is a block diagram of an exemplary system 10 for tracking calls to a technician call center. System 10 includes a number of call center terminals 12 operated by call center personnel. The call center terminals 12 may be implemented using a general-purpose computers executing a computer program for carrying out the processes described herein. Alternatively, call center terminals 12 may be implemented using devices programmed primarily for accessing network 14 such as a dumb terminal. Call center terminals 12 are coupled to network 14 which may be any type of known network including a local area network (LAN), wide area network (WAN), global network (e.g., Internet), intranet, virtual private network (VPN), etc. Call center terminals 12 may be physically located in geographically disperse call centers.

A user system 18 is also coupled to network 14. The user system 18 may be implemented using a general-purpose computer executing a computer program for carrying out the processes described herein. Alternatively, user systems 18 may be implemented using devices programmed primarily for accessing network 18 such as a dumb terminal. As described in further detail herein, the user system 18 requests reports based on call data entered on call center terminals 12.

The call center terminals 12 are coupled to a call data storage system 20 including a server 22 and a database 24. The call center terminals 12 may be coupled to the call data storage system 20 through multiple networks (e.g., intranet and Internet) so that not all call center terminals 12 are coupled to the call data storage system 20 by the same network. One or all of the call center terminals 12 and call data storage system 20 may be connected to the network 14 in a wireless fashion and network 14 may be a wireless network.

In operation, technicians contact call center personnel using communication devices 16 such as wireline phone, wireless phones, etc. In an embodiment of the invention, the technicians are also equipped with technician assistance devices. These may be similar to the type provided by Telcordia that allow the technician to perform certain tasks without call center involvement.

Typically, the technician is requesting some action from the call center such as sending test signals, requesting work orders, etc. As described in detail herein, the call center personnel uses call center terminal 12 to record call data relevant to the technician's call and stored the call data. The call data can then be analyzed to determine how to reduce technician calls to the call center and increase use of the technician assistance device.

Figure 2:
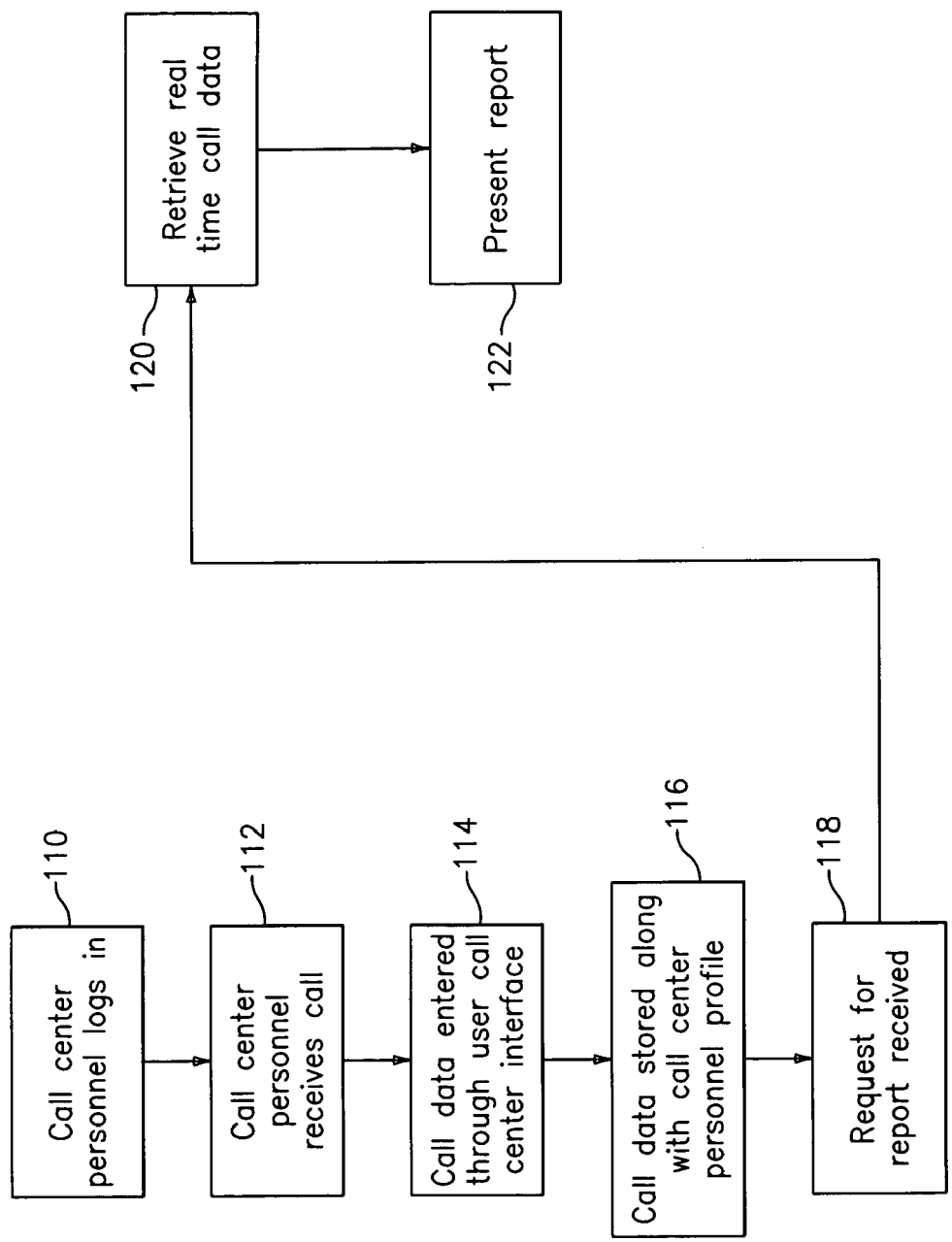
FIG. 2 is a flowchart of an exemplary process for tracking calls to a call center.

FIG. 2 is a flowchart of an exemplary process of receiving and tracking call data. The process begins at step 110 where a call center personnel logs into a call center terminal 12. This allows the identity of the call center personnel to be recognized. A profile associated with the call center personnel is stored along with the call data for reporting.

Figure 3:
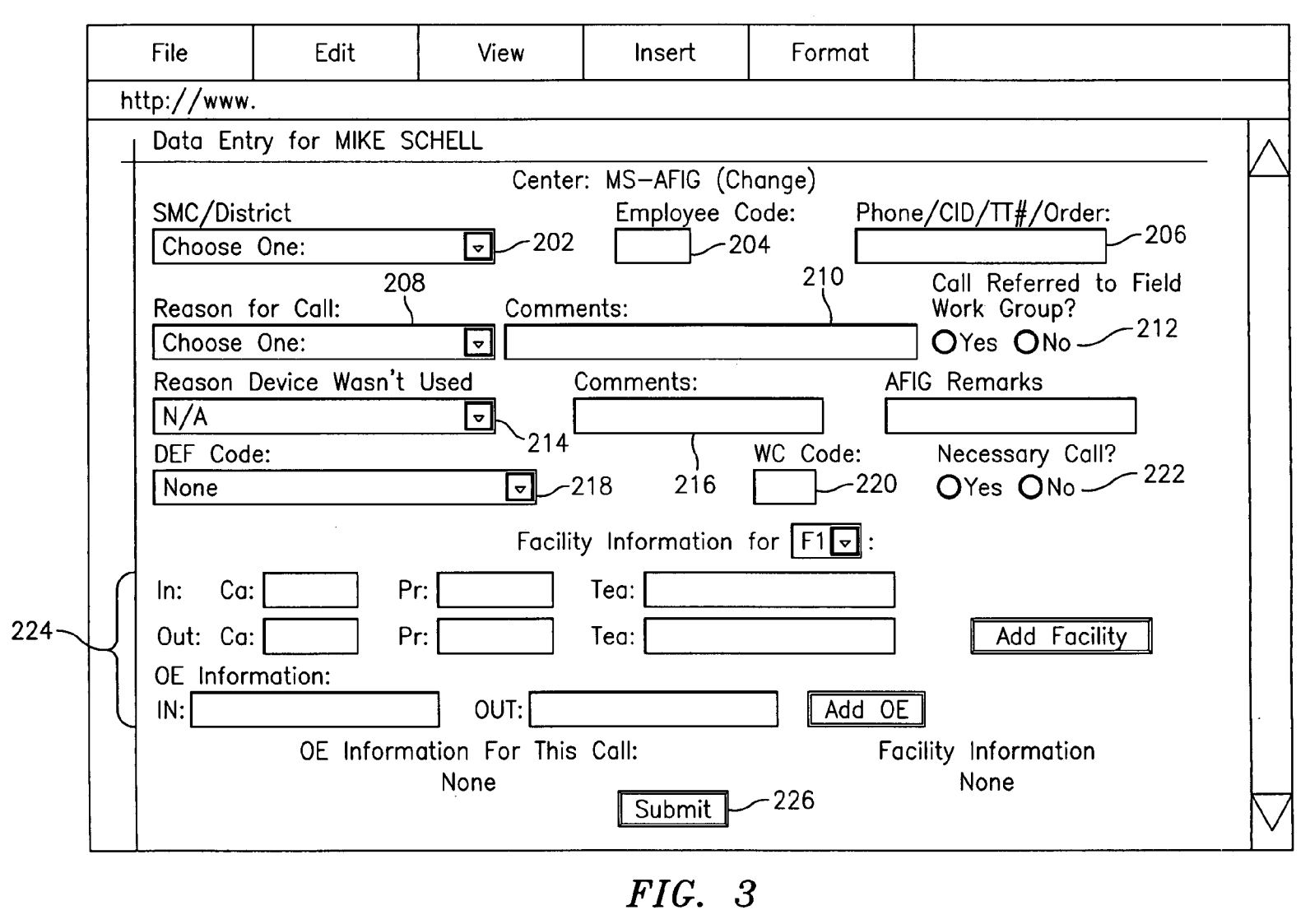

When a call is received by the call center personnel at step 112, call data related to the call is entered at step 114. FIG. 3 is an exemplary user interface provided on call center terminal 12 for entering the call data. The user interface may be generated at server 22 in HTML format and processed by a web browser application on the call center terminal 12. It is understood that other client-server techniques may be used between the server 22 and call center terminals 12. The user interface includes a number of predefined fields so that each call center personnel enters call data in a similar fashion. This allows the call data to be stored in database 24 in a consistent and accessible manner.

District field 202 is a drop down menu that allows the call center personnel to select a geographical code designating where the technician is located. Entries in drop down fields are stored and retrieved from the database 24. This allows values to be added or removed with an update to the database 24, without requiring coding changes such as active server page scripting. This also allows the drop down menus to be customized for use by other call centers that may receive calls for different reasons without requiring coding changes.

The employee field 204 allows the call center personnel to enter the technician's employee code. A service identifier field 206 allows the call center personnel to enter information identifying the service being performed such as the phone number being serviced, circuit identifier (CID), trouble ticket number, order number, etc.

A reason for call field 208 is a drop down menu that allows the call center personnel to select a predefined reason for the technician's call. Certain drop down choices (e.g., other) require that the call center personnel enter comments in comment field 210. Referral field 212 allow the call center personnel to designate whether the call has been referred to a field work group.

The call center personnel also selects a reason why the technician assistance device was not used through drop down field 214. The technician may need to contact the call center, rather than use the technician assistance device, it situations where the technician lacks the technician assistance device, the technician assistance device is defective, no connection could be established, etc. Certain drop down choices (e.g., other) require that the call center personnel enter comments in comment field 216.

A defect code field 218 is a drop down menu that allows the call center personnel to enter the defect being serviced by the technician. A wire center (WC) code field 220 allows the call center personnel to enter a geographical code indicating where the central office for the serviced connection is located. A necessary call field 222 allows the call center personnel to designate whether the call was necessary. In other words, the call center personnel is indicating whether the call was needed or whether the technician could have obtained assistance using the technician assistance device. Including this field allows reports to be generated that indicate why technicians are not using the technician assistance device. This information may be used to establish training or other procedures to increase use of the technician assistance device.

Facility information fields 224 are used to enter information concerning the connection from the central office to the facility being serviced by the technician. When the fields are completed, the call center personnel selects the submit icon 226 which cause the call data entered on the user interface and the call center personnel profile to be stored in database 24 by server 22 as shown at step 116. The call center personnel profile may be retrieved by using a web browser to interface between the call center terminal 12 and server 22, with the browser configured to accept cookies. This links the call center personnel with the profile. The call data is time stamped to record when the call data was submitted to the call data storage system 20.

Steps 110 through 116 may be repeated for multiple calls from technicians and for multiple call center terminals 12. The call data and call center personnel profile is accumulated in database 24 in real time as call center personnel enter the call data through the user interface.

Step 118 indicates receipt by the call data storage system 20 of a request for a report based on the call data. A variety of reports may be generated based on the call data. Exemplary reports include statistical reports for each call center, statistical reports based on geographic service area, reports on miscellaneous calls and detailed reports based on user-defined requests. The statistical reports may include information such as a total count of calls considered unnecessary, a count for each reason the technician assistance device was not used, a count for each type of call. Statistical measures, such as percentage of calls considered unnecessary arranged by geography. Since the database 24 is a relational database, users may submit completely customized report requests. As noted previously, the database 24 is updated in real time so that reports will contain the most up to date call data.

FIG. 4 illustrates an exemplary detailed report generated based on a user request to the call data storage system 20. The user requesting the report may be located remote from the call center using a user system 18. Interaction between the user system 18 and the server 22 may be based on web formats (e.g., HTML) with user system 18 executing a web browser application. It is understood that other client-server techniques may be used between user system 18 and call data storage system 20.

The report of FIG. 4 provides records for a call center in a geographical location. The report is sorted by employee code, identifying the technician that contacted the call center. The columns relate to the fields on the user interface of FIG. 3. One column of interest is labeled necessary call meaning was this call needed or should the technician have used the technician assistance device. If the technician assistance device was not used, the reason for not using the technician assistance device is presented. Using database access techniques, a variety of custom user reports may be generated.

The reports allow rapid detection of which technicians are not using the technician assistance device when they should, in what geographic areas and for what reasons. This allows the provider of the technician assistance devices to update training, systems or procedures to enhance use of the technician assistance devices and reduce the call burden on call centers.

As described above, the present invention can be embodied in the form of computer-implemented processes and apparatuses for practicing those processes. In an exemplary embodiment, the invention is embodied in computer program code executed by the server of the call data storage system. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method of tracking calls from technicians equipped with technician assistance devices, the method comprising:
   a call center personnel accessing a call center terminal;
   said call center personnel receiving a call from a technician;
   said call center personnel entering call data through a user interface including a plurality of fields, one of said fields being a designation of whether said call from said technician was necessary or unnecessary dependent upon whether the task performed by the technician may be performed using a technician assistance device;
   storing said call data;
   receiving a request from a user for a report; and
   generating said report identifying said call from said technician as necessary or unnecessary, said report including a count of calls identified as unnecessary and a percentage of calls identified as unnecessary arranged by geography;
   wherein said interface includes a field defining a reason why said technician assistance device was not used, said field includes a drop down menu of predefined reasons why said technician assistance device was not used;
   wherein selection of one of said predefined reasons why said technician assistance device was not used requires the call center personnel to enter comments.

2. The method of claim 1 further comprising:
   storing a call center personnel profile with said call data.

3. The method of claim 1 wherein:
   said call data is stored in real time, said generating said report being based on real time call data.

4. The method of claim 1 wherein:
   said user interface includes a field defining a reason why said technician called.

5. The method of claim 4 wherein:
   said field includes a drop down menu of predefined reasons why said technician called.

6. The method of claim 5 wherein:
   selection of one of said predefined reasons why said technician called requires the call center personnel to enter comments.

7. A system far tracking calls from technicians equipped with technician assistance devices, the system comprising:
   a call center terminal receiving call data through a user interface including a plurality of fields, one of said fields being a designation of whether said call from said technician was necessary or unnecessary;
   call data storage system coupled to said call center terminal by a network, said call data storage system receiving said call data;
   a user system coupled to said call data storage system;
   said call data storage system receiving a request from said user system for a report and generating said report identifying said call from said technician as necessary or unnecessary, said report including a count of calls identified as unnecessary and a percentage of calls identified as unnecessary arranged by geography;
   said user interface includes a field defining a reason why said technician assistance device was not used;
   said field includes a drop down menu of predefined reasons why said technician assistance device was not used;
   selection of one of said predefined reasons why said technician assistance device was not used requires the call center personnel to enter comments.

8. The system of claim 7 wherein:
   said call data storage system stores a call center personnel profile with said call data.

9. The system of claim 7 wherein:
   said call data storage system stores call data in real time and generates said report based on real time call data.

10. The system of claim 7 wherein:
    said user interface includes a field defining a reason why said technician called.

11. The system of claim 10 wherein:
    said field includes a drop down menu of predefined reasons why said technician called.

12. The system of claim 11 wherein:
    selection of one of said predefined reasons why said technician called requires the call center personnel to enter comments.

* * * * *